United States Patent Office 3,560,512
Patented Feb. 2, 1971

3,560,512
3-SUBSTITUTED-2,1-BENZISOTHIAZOLINE-2,2-DIOXIDES
Joseph A. Skorcz, Milwaukee, and John T. Suh and Claude I. Judd, Mequon, Wis., assignors to Colgate-Palmolive Company, New York, N.Y.
No Drawing. Continuation-in-part of application Ser. No. 571,972, Aug. 12, 1966. This application Nov. 14, 1967, Ser. No. 682,991
Int. Cl. C07d 91/06
U.S. Cl. 260—301
7 Claims

ABSTRACT OF THE DISCLOSURE

The compounds are 2,1-benzisothiazoline-2,2-dioxides substituted in the 3 position which are useful in the preparation of wood preservatives, moth proofing agents, pickling inhibitors and as pharmaceutical agents, particularly antihypertensive agents. Among the compounds disclosed are 1,3-dimethyl-3-(2'-carboxyethyl)-2,1-benzisothiazoline-2,2-dioxide and 1,3-dimethyl-3-[(N-dimethylaminoethyl) - 2' - carbamylethyl]-2,1-benzisothiazoline-2,2-dioxide.

The present application is a continuation-in-part of our copending application Ser. No. 571,972, filed Aug. 12, 1966, now abandoned.

SUMMARY OF THE INVENTION

The present invention relates to novel 3-substituted-2,1 - benzisothiazoline-2,2-dioxides, methods of preparing such compounds and compositions containing them.

DETAILED DESCRIPTION

The novel compounds of the present invention may be represented by the following formula:

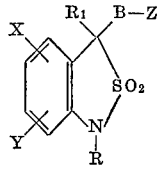

in which X and Y are selected from hydrogen, lower alkyl of 1 to 4 carbon atoms such as methyl, ethyl, propyl, isopropyl and butyl, lower alkoxy such as methoxy, ethoxy, propoxy and butoxy, an aralkoxy such as benzyloxy, nitro, halogen such as bromo or chloro and trifluoromethyl; R is a lower alkyl of 1 to 4 carbon atoms such as methyl, ethyl, propyl, isopropyl or butyl, a cycloalkyl of 3 to 7 carbon atoms such as cyclopropyl, cyclobutyl, cyclohexyl or cyclopentyl, a cycloalkyl-lower alkyl in which the cycloalkyl portion contains 3 to 7 carbon atoms such as cyclopropyl methyl, cyclopentyl methyl, cyclopentyl ethyl and cyclohexyl methyl, phenyl, a nuclear-substituted phenyl, particularly a lower alkoxy-substituted phenyl such as p-methoxyphenyl, or an aralkyl of 7 to 13 carbon atoms, particularly a phenyl-lower alkyl such as benzyl, phenethyl or phenylisopropyl; $R_1$ is R, hydrogen or cyanoethyl; B is a straight or branched chain alkylene of 1 to 6 carbon atoms such as methylene, ethylene or propylene; Z is hydrogen, hydroxy, cyano, carboxy, carbamyl, —O—$SO_2$-phenyl, C(NOH)$NH_2$, COR, and the groups $CO_2R_2$ and $CONR_1R_2$ in which $R_2$ is an alkyl of 1 to 8 carbon atoms or a tertiary amino-lower alkyl such as dimethylaminoethyl or diethylaminopropyl, and $R_1$ is not cyanoethyl.

The compounds of the invention may be conveniently prepared by employing a haloaniline such as o-chloroaniline or m-bromoaniline, or an N-substituted haloaniline such as N-phenyl-o-chloroaniline or N-p-methoxyphenyl-o-bromoaniline as the basic starting material.

If an unsubstituted haloaniline is employed, it is first treated with an alkylsulfonyl chloride to form a haloalkylsulfonanilide; the sulfonanilide is then treated with an alkyl ester such as dimethylsulfate, and a base such as potassium hydroxide, to form an N-substituted-haloalkyl-sulfonanilide. The thus obtained sulfonanilide is then treated with a nonparticipating strong base, for example, an alkali amide such as sodium amide in an inert reaction medium such as liquid ammonia, anhydrous ether, benzene or the like, to effect ring closure.

The described process may be diagrammed as follows:

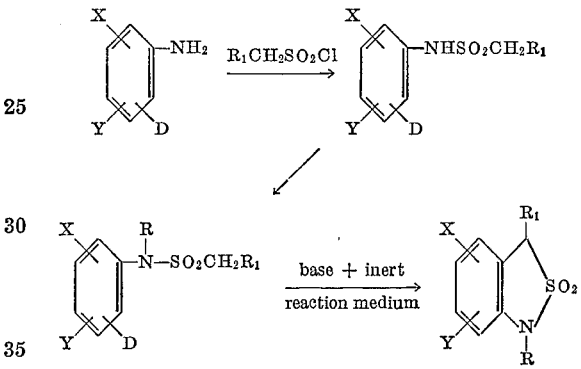

wherein D is a reactive halide, R, $R_1$, X and Y are groups which do not interfere with or partake in the reaction.

If an N-substituted haloaniline is employed as the starting material, it is first treated with an alkylsulfonyl chloride to form the alkylsulfonanilide derivative which may be treated directly with a suitable base in an inert reaction medium to effect ring closure. Although other bases such as phenyl lithium, butyl lithium and potassium t butoxide may be employed in the above process, the alkali amides are preferred.

This process may be diagrammed as follows:

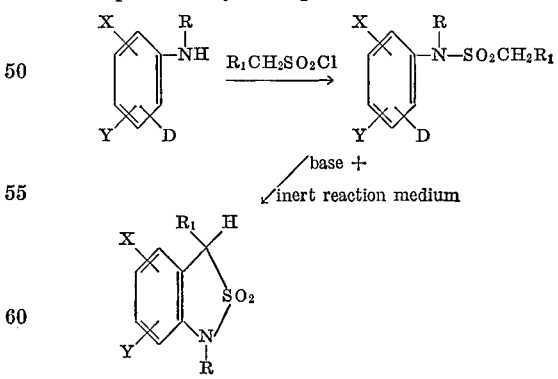

wherein D is a reactive halide, R, $R_1$, X and Y are groups which do not interfere with or partake in the reaction.

The 2,1-benzisothiazoline-2,2-dioxides obtained by the described processes may then be treated with either an α,β-unsaturated nitrile such as acrylonitrile or β methyl-acrylonitrile, to form the cyanoethyl derivative which provides a particularly useful starting material for the preparation of other compounds, or an α,β-unsaturated ketone such as methyl vinyl ketone or methyl betamethylvinyl ketone to form the compounds in which Z is —COR.

The processes may be illustrated as follows:

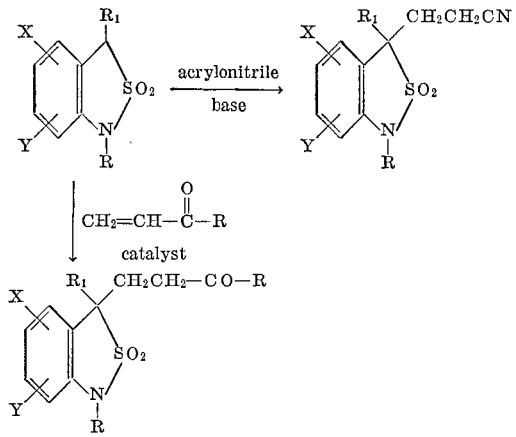

wherein $R_1$ is other than hydrogen and all other symbols are as described.

When $R_1$ is hydrogen in the starting material, then the above addition reactions take place at both the 3 and the 3' positions.

The cyanoethyl derivatives may be used to prepare a wide variety of derivatives including cyanoalkyl derivatives in which the alkylene chain B is larger than ethylene. The alkylene chain can be built up treating the cyanoethyl derivative with a lower alkanol such as ethanol in the presence of a suitable catalyst such as hydrochloric acid to form the corresponding ethyl ester, treating that compound with lithium aluminum hydride to form the alcohol, treating the alcohol with tosyl chloride in a suitable solvent such as pyridine to form the tosylate, and finally treating the tosylate with sodium cyanide to form the nitrile and, if desired, repeating the whole process to add another methylene group.

This process may be illustrated as follows:

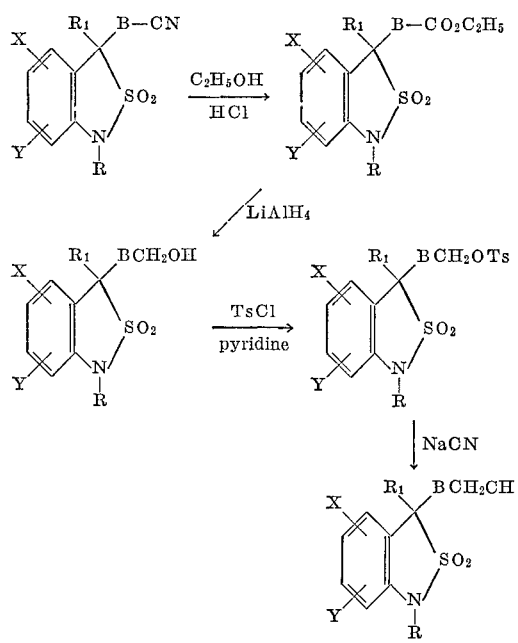

in which all symbols represent groups which do not partake in or interfere with the reaction.

The compounds in which Z is —CO$_2$H may be prepared by treating a 1,3-disubstituted-3-(2'-cyanoalkyl)-2,1-benzisothiazoline-2,2-dioxide with a suitable base such as ethanolic potassium hydroxide, adding water, refluxing the reaction mixture, removing the solvent, extracting with ether, acidifying the extracts and isolating the desired compound.

The described process may be diagrammed as follows:

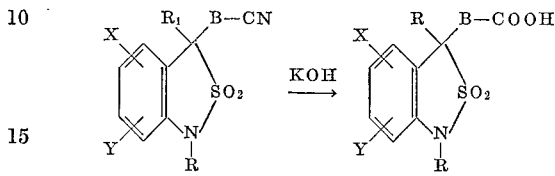

wherein all symbols have their assigned values and X and Y represent groups which do not partake in or interfere with the reaction.

Representative of the compounds which may be prepared by the described process are the following:

1,3-dimethyl-3-(2'-carboxyethyl)-2,1-benzisothiazoline-2,2-dioxide,
1,3-dimethyl-3-(3'-carboxypropyl)-2,1-benzisothiazoline-2,2-dioxide,
1-methyl-3-benzyl-3-(2'-carboxyethyl)-2,1-benzisothiazoline-2,2-dioxide,
1-methyl-3-benzyl-3-(3'-carboxypropyl)-2,1-benzisothiazoline-2,2-dioxide,
1-ethyl-3-benzyl-3-(3'-carboxypropyl)-2,1-benzisothiazoline-2,2-dioxide,
1-methyl-3-phenyl-3-(3'-carboxypropyl)-2,1-benzisothiazoline-2,2-dioxide,
1-phenethyl-3-methyl-3-(2'-carboxyethyl)-2,1-benzisothiazoline-2,2-dioxide, and
1-cyclopentylmtthyl - 3 - methyl-3-(2'-carboxyethyl)-2,1-benzisothiazoline-2,2-dioxide.

Those compounds in which Z is —C(NOH)NH$_2$ may be conveniently prepared by forming a mixture of hydroxylamine hydrochloride and sodium ethoxide in ethanol under nitrogen, adding the appropriate nitrile to the mixture, refluxing the reaction mixture, and isolating the desired product.

The described process may be diagrammed as follows:

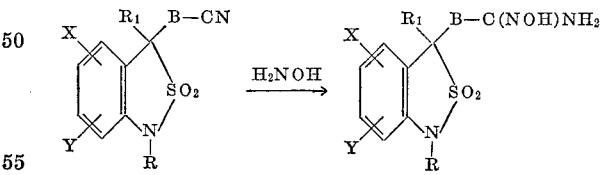

wherein all symbols have their assigned values and X and Y represent groups which do not partake in or interfere with the reaction.

Representative of the compounds which may be prepared by the described process are the following:

1,3,-dimethyl - 3 - (2'-hydroxyamidinoethyl)-2,1-benzisotriazoline-2,2-dioxide,
1-phenethyl - 3 - methyl-3-(2'-hydroxyamidinoethyl)-2,1-benzisothiazoline-2,2-dioxide, and
1-cyclopentylmethyl - 3 - methyl-3-(3'-hydroxyamidinopropyl)-2,1-benzisothiazoline-2,2-dioxide.

The compounds in which Z is —CO$_2$R$_2$ and wherein $R_2$ is alkyl may be conveniently produced by preparing a solution of the appropriate nitrile, water, and an alkanol (e.g. ethanol), treating it with a stream of hydrogen chloride gas, and recovering the desired product by conventional means.

The described process may be diagrammed as follows:

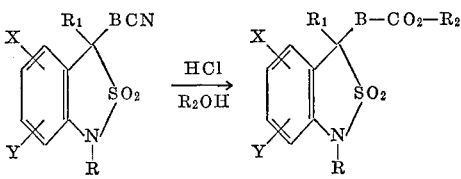

wherein $R_2$ is an alkyl of 1 to 8 carbon atoms and all other symbols have their assigned values and represent groups which do not partake in or interfere with the reaction.

Representative of the compounds which may be prepared by the described process are the following:

1,3-dimethyl - 3 - (2'-carbethoxyethyl)-2,1-benzisothiazoline-2,2-dioxide,
1,3-dimethyl - 3 - (2'-carbomethoxyethyl)-2,1-benzisothiazoline-2,2-dioxide,
1-phenethyl - 3 - methyl-3-(2'-carbomethoxyethyl)-2,1-benzisothiazoline-2,2-dioxide, and
1-cyclopentylmethyl - 3 - methyl-3-(3'-carbobutoxypropyl)-2,1-benzisothiazoline-2,2-dioxide.

The compounds in which Z is —$CONH_2$, —$CONHR_2$ and —$CO_2R_2$ may be prepared by treating the corresponding compounds in which Z is —COOH with thionyl chloride followed by treatment with either ammonia, an aminoalcohol or an amine.

The processes may be diagrammed as follows:

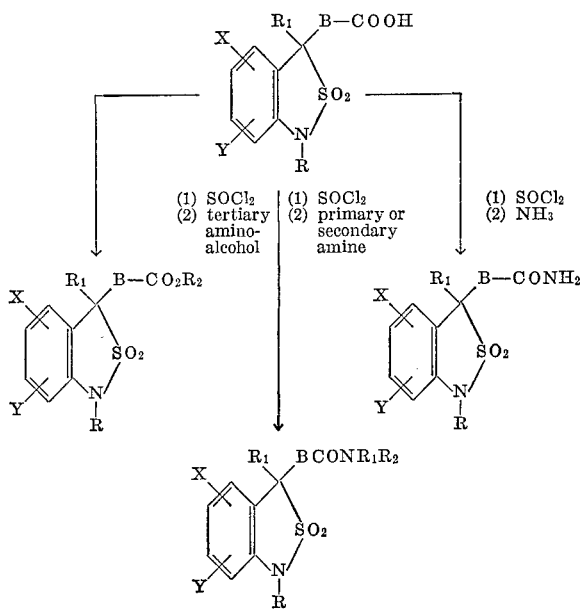

wherein $R_1$ is not cyanoethyl and X and Y represent groups that do not partake in or interfere with the reaction.

Representative of the compounds which may be prepared by the described process are the following:

1,3-dimethyl - 3 - (2'-carbamylethyl)-2,1-benzisothiazoline-2,2-dioxide,
1-phenethyl - 3 - methyl-3-(N,N-dimethyl-2'-carbamylethyl)-2,1-benzisothiazoline-2,2-dioxide,
N-dimethylaminoethyl β-[3-(1,3 - dimethyl)-2,1-benzisothiazolinyl]propionate-2,2-dioxide,
N-diethylaminoethyl β-[3-(3-methyl - 1-phenyl)-2,1-benzisothiazolinyl]propionate-2,2-dioxide,
N-dimethylaminoethyl-{β-[3-(1,3 - dimethyl)-2,1-benzisothiazolinyl]}propionamide-2,2-dioxide, and
N-dimethylamidoethyl-{β - [3 - (cyclopropylmethyl - 3-ethyl)-2,1-benzisothiazolinyl]}propionamide - 2,2 - dioxide.

The compounds in which X and Y are other than hydrogen are preferably prepared by using conventional nitration, chlorination and the like techniques, to place the ring substituent into the 1-substituted-2,1-benzisothiazoline-2,2-dioxide. For example, chlorine may be inserted into the 5 position by treating a 1-substituted-2,1-benzisothiazoline-2,2-dioxide with N-chlorosuccinimide in dimethylformamide.

Acid addition salts of the compounds if the present invention may be conveniently prepared by contacting those compounds capable of forming such salts with a suitable acid such as formic acid, citric acid, maleic acid, sulfuric acid, hydrochloric acid, succinic acid, tartaric acid, benzoic acid or fumaric acid.

Quaternary ammonium salts may be formed by contacting those compounds capable of forming such salts with a suitable alkylating agent such as dimethyl sulfate or an alkyl halide such as methyl chloride, methyl iodide or ethyl bromide.

The thiocyanic acid addition salts of the compounds of this invention when condensed with formaldehyde form resinous materials useful as pickling agents according to U.S. Pats. 2,425,320 and 2,606,155. The compounds also form fluosilicic acid addition salts which are useful as moth proofing agents according to U.S. Pats. 1,915,334 and 2,075,359.

The novel compounds of the invention are pharmacologically active, especially the compounds 1,3-dimethyl-3 - (2-cyanoethyl)-2,1-benzisothiazoline-2,2-dioxide, 1,3-dimethyl - 3 - (2-carboxyethyl)-2,1-benzisothiazoline-2,2-dioxide, 1,3 - dimethyl - 3-[(N - dimethylaminoethyl)-2-carbamylethyl]-2,1-benzisothiazoline-2,2-dioxide and 1-methyl - 3,3 - bis(2' - cyanoethyl) - 2,1-benzisothiazoline-2,2-dioxide which have been shown at intravenous doses of about 10 mg./kg. to lower blood pressure 10 to 40% in the standard vagotomized sodium pentobarbital anesthetized dog preparation. The above compounds have also been shown in mouse behavior studies to produce behavioral profiles similar to those produced with known antihypertensive agents. The mouse behavior studies which also established that the compounds had $LD_{50}$'s in excess of 200 mg./kg. intraperitoneally were conducted in accord with the procedure outlined by S. Irwin in "Animal and Clinical Pharmacologic Techniques in Drug Evaluation," J. H. Nodine and P. E. Siegler, Ed., Year Book Medical Publishers, Inc. 1964.

The following examples are presented to illustrate this invention:

EXAMPLE 1 o-Chloroethanesulfonanilide

To a solution of 8 moles of o-chloroaniline in 1.2 liters of toluene is added a solution of 514 g. (4 moles) of ethanesulfonyl chloride in 600 ml. of toluene over a 2-hr. period. The mixture is refluxed for 16 hrs., cooled, and filtered. The filtrate is washed thoroughly with 10% HCl and with saturated brine, dried, and evaporated. The crude residue is stirred with 5 liters of 10% NaOH for 3 hrs. After separation of the insoluble material, the aqueous solution is acidified with concentrated HCl and cooled. The precipitate is filtered and dried to give o-chloroethanesulfonanilide as a straw-colored powder, M.P. 46–49°.

Analysis.—Calcd. for $C_8H_{10}ClNO_2S$ (percent): C, 43.74; H, 4.59; Cl, 16.14; S, 14.59. Found (percent): C, 43.81; H, 4.72; Cl 16.16; S, 14.69.

EXAMPLE 2

N-Methyl-o-chloroethanesulfonanilide

To a solution of 550 g. (2.5 moles) of o-chloroethanesulfonanilide and 351 g. (6.25 moles) of KOH in 3 liters of water is added 630 g. (5 moles) of dimethyl sulfate. The mixture is stirred at 70° for 6 hrs. and then cooled. The crude product is taken up in chloroform, which is dried and evaporated. Distillation of the residue gives N-methyl-o-chloroethanesulfonanilide as a colorless liquid, B.P. 120–122° (0.05 mm.).

*Analysis.*—Calcd. for $C_9H_{12}ClNO_2S$ (percent): C, 46.25; H, 5.18; Cl, 15.17; S, 13.72. Found (percent): C, 46.36; H, 5.30; Cl, 15.22; S, 13.98.

EXAMPLE 3

1,3-dimethyl-2,1-benzisothiazoline-2,2-dioxide

A solution of N-methyl-o-chloroethanesulfonanilide (23.4 g., 0.1 mole) in 40 ml. of anhydrous ether is added dropwise to 0.35 mole of potassium amide in 1 liter of liquid ammonia. After 15 min., the reaction is quenched with 0.25 mole of ammonium chloride, and the solvent allowed to evaporate. The residue is treated with 150 ml. of 10% HCl and 150 ml. of chloroform, which is separated, dried, and evaporated. Distillation of the residual liquid yields 1,3-dimethyl-2,1-benzisothiazoline-2,2-dioxide as a straw-colored oil, B.P. 130–132° (0.06 mm.).

*Analysis.*—Calcd. for $C_9H_{11}NO_2S$ (percent): C, 54.80; N, 7.13; S, 16.25. Found (percent): C, 55.05; H, 5.87; N, 7.15; S, 16.21.

EXAMPLE 4

1,3-dimethyl-3-(2'-cyanoethyl)-2,1-benziothiazoline-2,2-dioxide

To a cooled solution of 198 g. (0.1 mole) or 1,3-dimethyl-2,1-benzisothiazoline-2,2-dioxide and 1 ml. of 30% methanolic potassium hydroxide in 100 ml. of tert-butyl alcohol is added dropwise 5.8 g. (0.11 mole) of acrylonitrile, and the cloudy solution stirred at room temperature for 20 hours. The reaction mixture is acidified with 4 N hydrochloric acid, diluted with 1.5 liters of water, and extracted with two 500-ml. portions of ether. The ether extracts are combined, dried, and evaporated. Elution of the residual oil from alumina with benzene yields 1,3-dimethyl-3-(2'-cyanoethyl)-2,1-benzisothiazoline-2,2-dioxide in the form of a straw-colored oil.

*Analysis.*—Calcd. for $C_{12}H_{14}N_2O_2S$ (percent): C, 57.58; H, 5.63; N, 11.19; S, 12.81. Found (percent): C, 57.81; H, 5.79; N, 10.92; S, 12.64.

EXAMPLE 5

1,3-dimethyl-3-(2'-carboxyethyl)-2,1-benzisothiazoline-2,2-dioxide

To 15 g. (0.06 mole) of the nitrile of Example 4 is added 100 ml. of potassium hydroxide-saturated ethanol, and the resulting milky solution stirred at 25° overnight. Water (40 ml.) is added, and the solution refluxed for 7 hours. Most of the solvent then is removed under vacuum, and the residue dissolved in 300 ml. of water. After two extractions with ether (50 ml.) and acidification with concentrated hydrochloric acid, the separated organic layer is taken up in ether, which is shaken with saturated brine, dried and evaporated. Recrystallization of the residual solid from chloroform-petroleum ether provides the 1,3-dimethyl-3-(2'-carboxyethyl)-2,1-benzisothiazoline as light tan flakes, M.P. 126–182°.

*Analysis.*—Calcd. for $C_{12}H_{15}NO_4$ (percent): C, 53.53; H, 5.62; S, 11.91. Found (percent): C, 53.35; H, 5.51; S, 11.96.

EXAMPLE 6

1,3-dimethyl-3-(3'-oxobutyl)-2,1-benzisothiazoline-2,2-dioxide

A well-cooled solution of 5.9 g. (0.03 mole) of 1,3-dimethyl-2,1-benzisothiazoline-2,2-dioxide and 0.6 g. of a 40% aqueous solution of trimethylbenzyl ammonium hydroxide in 30 ml. of t-butyl alcohol is treated dropwise with 3 g. (0.043 mole) of methyl vinyl ketone. The resulting amber solution is allowed to slowly warm to room temperature with stirring, then continued for a total of 43 hours. After acidification with 2 N sulfuric acid, the reaction mixture is diluted with water (300 ml.) and extracted with three 100-ml. portions of ether, which are combined, washed with saturated brine, and dried ($Na_2SO_4$). Solvent evaporation affords 10.6 g. of an amber liquid, which is eluted from 200 g. of silica gel with benzene-ether (3:1). The yellow oil thereby isolated is further purified by rechromatography on 100 ml. of silica gel. Addition of dry ether to this material brings about solidification, and the 1,3-dimethyl-3-(3'-oxobutyl)-2,1-benzisothiazoline-2,2-dioxide is obtained as a white powder, M.P. 76–78.5°.

*Analysis.*—Calcd. for $C_{13}H_{17}NO_3S$ (percent): C, 58.40; H, 6.41; N, 5.25. Found (percent): C, 58.38; H, 6.47; N, 5.48.

EXAMPLE 7

1,3-dimethyl-3-(2'-carbethoxyethyl)-2,1-benzisothiazoline-2,2-dioxide

A solution of 7.5 g. (0.03 mole) of the nitrile of Example 4 and 0.54 g. (0.03 mole) of water in 120 ml. of absolute ethanol is stirred and treated with a stream of hydrogen chloride gas for 1 hour and filtered. The filtrate is evaporated to dryness, and the residual oil taken up in chloroform, washed with saturated sodium bicarbonate solution, then with saturated brine, dried ($Na_2SO_4$), and evaporated. Elution of the remaining material from 125 g. of silica gel with benzene ether yields 1,3-dimethyl-3-(2'-carbethoxyethyl)-2,1-benzisothiazoline-2,2-dioxide as a pale yellow liquid.

*Analysis.*—Calcd. for $C_{14}H_{19}NO_4S$ (percent): C, 56.54; H, 6.42; N, 4.71. Found (percent): C, 55.78; H, 6.34; N, 5.08.

EXAMPLE 8

1,3-dimethyl-3-(2'-hydroxyamidinoethyl)-2,1-benzisothiazoline-2,2-dioxide hydrochloride To a solution of 0.46 g. (0.02 g.-atom) of sodium in 40 ml. of absolute ethanol is added under nitrogen 1.4 g. (0.02 mole) of hydroxylamine hydrochloride. The mixture is stirred for several minutes at room temperature, and then a suspension of 5.0 g. (0.02 mole) of the nitrile of Example 4 in 60 ml. of ethanol is added. The reaction mixture is refluxed for 6 hours, stirred overnight at 25°, and then filtered. The filtrate is diluted with approximately 300 ml. of ether, and the resulting hazy solution is saturated with hydrogen chloride gas. The deposited solid melts at 199–200° with decomposition. Recrystallization from ethanol-ether yields 1,3-dimethyl-3-(2'-hydroxyamidinoethyl)-2,1-benzisothiazoline-2,2-dioxide hydrochloride in the form of a tan powder, M.P. 200–201°.

*Analysis.*—Calcd. for $C_{12}H_{18}ClN_3O_3S$ (percent): C, 45.07; H, 5.67; S, 10.03. Found (percent): C, 44.92; H, 5.77; S, 9.78.

EXAMPLE 9

1,3-dimethyl-3-(2'-carbamylethyl)-2,1-benzisothiazoline-2,2-dioxide

A solution of 19.7 g. (0.10 mole) of 1,3-dimethyl-2,1-benzisothiazoline-2,2-dioxide and 2 ml. of 30% methanolic KOH in 100 ml. of t-butanol is treated portionwise with 7.8 g. (0.11 mole) of acrylamide and then stirred at room temperature for 34 hours. After standing an additional 33 hours, the reaction mixture is acidified with 2 N $H_2SO_4$, diluted with water (600 ml.), and extracted with three 125-ml. portions of ether, which are combined, dried ($Na_2SO_4$), and evaporated. Recrystallization of the residual solid from chloroform-petroleum ether yields 1,3-dimethyl-3-(2'-carbamylethyl)-2,1-benzisothiazoline-2,2-dioxide, M.P. 115–117°.

*Analysis.*—Calcd. for $C_{12}H_{16}N_2O_3S$ (percent): C, 53.73; H, 6.01; N, 10.44; S, 11.94. Found (percent): C, 53.39; H, 5.89; N, 10.52; S, 11.54.

EXAMPLE 10

1,3-dimethyl-3-[ethyl-(dimethylaminoethyl)-2'-carboxylate]-2,1-benzisothiazoline-2,2-dioxide maleate Tht acid chloride, prepared from 5.4 g. (0.03 mole) of the related acid of Example 5 and 7 g. of thionyl chloride in pyridine (0.03 mole)-benzene (75 ml.), in 50 ml. of dry benzene is added dropwise under nitrogen to a cooled solution of dimethylaminoethanol (3.6 g., 0.04 mole) in benzene (25 ml.). The mixture is stirred at room temperature for 19 hours, extracted with two 50-ml. portions of 5% NaOH, dried, and evaporated. The residual oil is converted to 1,3-dimethyl-3-[ethyl-(dimethylaminoethyl) - 2' - carboxylate]-2,1-benzisothiazoline-2,2-dioxide maleate, which is isolated as pale tan pellets, M.P. 108–111°. A sample recrystallized from ethanol-ether melted at 110–112.5°.

*Analysis.*—Calcd. for $C_{20}H_{28}N_2O_8S$ (percent): C, 52.63 H, 6.18; N, 6.14. Found (percent): C, 52.72; H, 6.08; N, 6.43.

EXAMPLE 11

1,3-dimethyl-3-[(N-dimethylaminoethyl)-2'-carbamylethyl]-2,1-benzisothiazoline-2,2-dioxide To the acid chloride prepared from 5.4 g. (0.02 mole) of the appropriate acid in 75 ml. of dry benzene is added, under nitrogen and with cooling, a solution of dimethylaminoethylamine in 25 ml. of benzene. The resulting mixture is stirred overnight at 25°, then extracted twice with 5% NaOH, washed with saturated brine, dried, and evaporated. The residual oil is eluted from 230 g. of alumina with ether to give 1,3-dimethyl-3-[(N-dimethylaminoethyl) - 2' - carbamylethyl]-2,1-benzisothiazoline-2,2-dioxide as a colorless, viscous liquid.

*Analysis.*—Calcd. for $C_{16}H_{25}N_3O_3S$ (percent): C, 56.61; H, 7.42; N, 12.38; S, 9.44. Found (percent): C, 55.88; H, 7.46; N, 12.30; S, 9.14.

EXAMPLE 12

1-methyl-3,3-bis(2'-cyanoethyl)-2,1-benzisothiazoline-2,2-dioxide

A solution of 1-methyl - 2,1 - benzisothiazoline-2,2-dioxide (16.5 g., 0.09 mole) and 1 ml. of a 40% aqueous solution of trimethylbenzyl ammonium hydroxide in 75 ml. of dioxane is cooled and treated dropwise with 14.4 g. (0.27 mole) of acrylonitrile. The solution is stirred overnight at 25°, acidified with 1 N sulfuric acid, and evaporated under vacuum. The residue is taken up in chloroform, washed with water, dried, and evaporated. Elution of the remaining 20.4 g. of oil from 1 kg. of alumina with benzene-ether (2:1) gives some unchanged starting material followed by the dinitrile as a yellow-orange oil which solidified on standing. Recrystallization of the product from chloroform-petroleum ether yields 1-methyl - 3,3 - bis(2'-cyanoethyl)-2,1-benzisothiazoline-2,2-dioxide in the form of cream-colored granules, M.P. 100–101.5°.

*Analysis.*—Calcd. for $C_{14}H_{15}N_3O_2S$ (percent): C, 58.11; H, 5.22; N, 14.52. Found (percent): C, 58.00; H, 5.08; N, 14.21.

EXAMPLE 13

1,3-dimethyl-5-chloro-2,1-benzisothiazoline-2,2-dioxide

A solution of 1,3-dimethyl - 2,1 - benzisothiazoline-2,2-dioxide (9.85 g., 0.05 mole) and 6.5 g. (0.05 mole) of N-chlorosuccinimide in 60 ml. of dimethylformamide is heated at an oil bath temperature of 95° for 16 hours. The cooled solution is diluted with water (600 ml.) and extracted with two 125 ml. portions of ether, which are combined, shaken with saturated brine, dried ($Na_2SO_4$), and evaporated. The residual oil is dissolved in chloroform, which is heated with decolorizing charcoal, filtered, and evaporated. Elution of the remaining oil (10.8 g.) from silica gel (270 g.) with benzene-ether (8:1) yields a solid product. Recrystallization from cyclohexane-benzene (2:1) gives 1,3-dimethyl - 5 - chloro - 2,1 - benzisothiazoline-2,2-dioxide in the form of white crystals, M.P. 74–76°.

*Analysis.*—Calcd. for $C_9H_{10}ClNO_2S$ (percent): C, 46.65; H, 4.35; N, 6.05. Found (percent): C, 46.46; H, 4.17; N, 5.95.

EXAMPLE 14

1,3-dimethyl-3-(2'-cyanoethyl)-5-chloro-2,1-benzisothiazoline-2,2-dioxide

A solution of 1,3-dimethyl - 5 - chloro - 2,1 - benzisothiazoline-2,2-dioxide (4.8 g., 0.021 mole) in t-butanol (25 ml.)-dioxane (10 ml.) is cooled and treated with 0.3 ml. of 30% methanolic KOH and then with 1.2 g. (0.023 mole) of acrylonitrile. Within a short time a precipitate forms, and the mixture is stirred at 25° for 24 hours. After neutralization with 4 N HCl and dilution with 300 ml. of water, the solid is filtered and dried. The pale yellow powder melted at 101–102°. Recrystallization from petroleum ether-chloroform (1:1) gives 1,3-dimethyl-3-(2'-cyanoethyl) - 5 - chloro - 2,1 - benzisothiazoline-2,2-dioxide in the form of small white flakes, M.P. 102–103°.

*Analysis.*—Calcd. for $C_{12}H_{13}ClN_2O_2S$ (percent): C, 50.61; H, 4.60; N, 9.84. Found (percent): C, 50.34; H, 4.45; N, 9.79.

We claim:
1. A compound selected from compounds and pharmaceutically acceptable salts of compounds of the formula

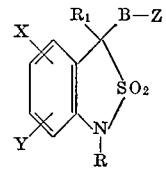

in which X and Y are hydrogen, halogen, lower alkyl, nitro, lower alkoxy, benzyloxy or $CF_3$; R is lower alkyl, phenyl or benzyl, $R_1$ is hydrogen, lower alkyl or benzyl, B is an alkylene of 2 to 6 carbon atoms, and Z is cyano, carboxy, carbamyl, carboxy-lower alkyl, —COR,

—C(NOH)NH₂

—$CO_2R_2$ in which $R_2$ is hydrogen or lower alkyl and —$CO_2NHR_2$ in which $R_2$ is dimethylaminoethyl.

2. A compound of claim 1 in which X and Y are hydrogen, R is lower alkyl, phenyl or benzyl, $R_1$ is hydrogen, lower alkyl or benzyl, and Z is cyano, carboxy, carbamyl, carboxy-lower alkyl, —COR, —C(NOH)NH₂ and —$CO_2R_2$.

3. A compound of claim 1 in which Y is hydrogen or chloro, $R_1$ and R are methyl, B is ethylene and Z is cyano.

4. A compound of claim 1 in which X and Y are hydrogen, R and $R_1$ are methyl, B is ethylene and Z is —$CO_2R_2$ in which $R_2$ is hydrogen or ethyl.

5. A compound of claim 1 in which X and Y are hydrogen, R and $R_1$ are methyl, B is ethylene and Z is —C(NOH)NH₂.

6. A compound of claim 1 in which X and Y are hydrogen, R and $R_1$ are lower alkyl, B is ethylene and Z is carboxy-lower alkyl.

7. A compound of claim 1 in which X and Y are hydrogen, R and $R_1$ are lower alkyl, B is ethylene and Z is carbamyl.

References Cited

UNITED STATES PATENTS 3,190,917   6/1965   Johnson et al. _____ 260—294

OTHER REFERENCES

Bunnet et al., Chem. Abstracts, 58: 11351h (1963).
Mustafa et al., Chem. Abstracts, 47: 1129h (1953).

ALEX MAZEL, Primary Examiner

R. J. GALLAGHER, Assistant Examiner

U.S. Cl. X.R.

260—556, 999